(12) United States Patent
Cano-Iranzo et al.

(10) Patent No.: US 9,476,125 B2
(45) Date of Patent: *Oct. 25, 2016

(54) CHROMIUM-FREE CONVERSION COATING

(71) Applicant: The Boeing Company, Seal Beach, CA (US)

(72) Inventors: Francisco Jesus Cano-Iranzo, San Sebastian (ES); Uxoa Izagirre-Etxeberria, Zumaia (ES); Oihana Zubillaga-Alcorta, Hernani (ES); Patricia Santa Coloma-Mozo, Vitoria (ES); Nieves Lapena-Rey, Madrid (ES)

(73) Assignee: The Boeing Company, Chicago, IL (US)

( * ) Notice: Subject to any disclaimer, the term of this patent is extended or adjusted under 35 U.S.C. 154(b) by 780 days.

This patent is subject to a terminal disclaimer.

(21) Appl. No.: 13/662,412

(22) Filed: Oct. 26, 2012

(65) Prior Publication Data

US 2013/0052352 A1   Feb. 28, 2013

Related U.S. Application Data

(63) Continuation-in-part of application No. 12/442,104, filed as application No. PCT/US2007/016681 on Jul. 24, 2007, now Pat. No. 8,298,350.

(30) Foreign Application Priority Data

Aug. 8, 2006   (EP) ..................................... 06380228
Aug. 31, 2012   (EP) ..................................... 12382337

(51) Int. Cl.
*C23C 22/48*   (2006.01)
*C23C 22/34*   (2006.01)
(Continued)

(52) U.S. Cl.
CPC ................. *C23C 22/34* (2013.01); *C09D 5/24* (2013.01); *C09D 7/12* (2013.01); *C23C 2222/20* (2013.01)

(58) Field of Classification Search
CPC .... C23C 2222/20; C23C 22/34; C23C 22/48
See application file for complete search history.

(56) References Cited

U.S. PATENT DOCUMENTS 5,089,173 A   2/1992   Frentzel et al.
5,342,456 A   8/1994   Dolan
(Continued)

FOREIGN PATENT DOCUMENTS

DE   10236153 A1   2/2004
DE   102004037542 A1   2/2006
(Continued)

OTHER PUBLICATIONS

Racicot, R.J., et al., "Corrosion Protection Comparison of a Chromate Conversion Coating to a Novel Conductive Polymer Coating on Aluminum Alloys", 1997, NACE International, Corrosion 97, Paper No. 531 (Abstract).
(Continued)

*Primary Examiner* — Lois Zheng

(57) ABSTRACT

A chromium-free conversion coating is prepared by the addition of inorganic metallic salts and one or more silanes to dispersions of conducting polymers which are then exposed to alloys of aluminum or other metals. Advantageously, the performance of the coating is comparable to that of conventional chromium-based methods for a number of aluminum alloys having particular significance in the manufacture of aircraft.

18 Claims, 11 Drawing Sheets

(51) Int. Cl.
*C09D 5/24* (2006.01)
*C09D 7/12* (2006.01)

(56) References Cited

U.S. PATENT DOCUMENTS

| | | |
|---|---|---|
| 5,928,795 A | 7/1999 | Spellane et al. |
| 5,980,723 A | 11/1999 | Runge-Marchese et al. |
| 6,113,709 A | 9/2000 | Jiang et al. |
| 6,150,032 A | 11/2000 | Yang et al. |
| 6,153,022 A | 11/2000 | Yoshida et al. |
| 6,190,780 B1 | 2/2001 | Shoji et al. |
| 6,328,874 B1 | 12/2001 | Kinlen et al. |
| 6,419,731 B2 | 7/2002 | Inbe et al. |
| 6,521,029 B1 | 2/2003 | Matzdorf et al. |
| 6,736,908 B2 | 5/2004 | Sako et al. |
| 6,758,916 B1 | 7/2004 | McCormick |
| 2004/0009300 A1 | 1/2004 | Shimakura et al. |
| 2004/0022950 A1 | 2/2004 | Jung et al. |
| 2004/0022951 A1 | 2/2004 | Maurus |
| 2004/0062873 A1 | 4/2004 | Jung et al. |
| 2004/0216637 A1 | 11/2004 | Buchheit et al. |
| 2006/0134339 A1 | 6/2006 | Wang et al. |
| 2006/0234072 A1* | 10/2006 | Ostrovsky ............ C23C 22/34 428/469 |
| 2007/0187001 A1 | 8/2007 | Kramer et al. |
| 2008/0305341 A1 | 12/2008 | Plieth et al. |

FOREIGN PATENT DOCUMENTS

| | | |
|---|---|---|
| EP | 0792922 A | 9/1997 |
| EP | 0623159 B1 | 6/1999 |
| EP | 1887105 A1 | 2/2008 |
| GR | 990100423 A | 8/2001 |
| GR | 1003763 B2 | 2/2002 |
| WO | WO 9314166 A1 | 7/1993 |
| WO | WO 03027203 A2 | 4/2003 |
| WO | WO 03056062 A2 | 7/2003 |
| WO | WO 2005061761 A1 | 7/2005 |
| WO | WO 2006015756 A1 | 2/2006 |
| WO | WO 2008094193 A2 | 8/2008 |
| WO | WO 2008094193 A3 | 8/2008 |

OTHER PUBLICATIONS

Paloumpa, I., et al., "Mechanisms to inhibit Corrosion of Al alloys by Polymeric Conversion Coatings", Surface and Coatings Technology, 180-181 (2004) 308-312 (Abstract).

European Search Report from European Patent Office for related EP06380228, Feb. 7, 2007, 5 pages.

European Patent Office Extended European Search Report dated Feb. 8, 2013, for counterpart EP Application No. 12382337.9-1362, 7 pages.

* cited by examiner

| Material Property | PANI | PEDOT | PPY |
|---|---|---|---|
| Polymer | Polyaniline | Polyethylenedioxythiophene | Polypyrrole |
| Solid Content | 6.0% | 1.2 - 1.4% | 6.0% |
| Dilution With | Water | Water | Water |
| pH | 2 - 3 | 1.5 - 2.5 | 3 or less |
| Conductivity (S/cm) | 1-2 Pressed Pellets | Up To 10 Cast Film | 0.01 - 0.001 Cast Film |
| Surface Resistivity (Ohm) | 10E4 | 10E6 | 10E4 - 10E6 |
| Viscosity | 18 Pas | 60 - 100 mPas | N.A. |
| Supplier | Panipol | Bayer | Eeonyx |
| Trade Name | Panipol W | Baytron P | Eeonomer 7000 |

FIG. 2

PEDOT / Zr

| Experiment | [PEDOT] (%) | [Zr] (g/L) * | pH ** |
|---|---|---|---|
| PEDOT 1 | 0.43 | 8 | 2 |
| PEDOT 2 | 0.86 | 5 | 3.5 |
| PEDOT 3 | 0.43 | 2 | 2 |
| PEDOT 4 | 1.30 | 2 | 2 |
| PEDOT 5 | 0.43 | 8 | 5 |
| PEDOT 6 | 1.30 | 2 | 5 |
| PEDOT 7 | 1.30 | 8 | 2 |
| PEDOT 8 | 0.86 | 5 | 3.5 |
| PEDOT 9 | 0.43 | 2 | 5 |
| PEDOT 10 | 0.86 | 5 | 3.5 |
| PEDOT 11 | 1.30 | 8 | 5 |
| PEDOT 12 | 0.43 | 5 | 3.5 |
| PEDOT 13 | 0.86 | 2 | 3.5 |
| PEDOT 14 | 0.86 | 5 | 2 |

Experimental Conditions for PEDOT / Zr

\* [Zr] g/L = [$K_2ZrF_6$] g/L;
\*\* pH Adjusted with $H_2ZrF_6$ and/or $NH_4OH$

FIG. 3

| Experiment | PPY / Zr | | |
|---|---|---|---|
| | [PEDOT] (%) | [Zr] (g/L) * | pH ** |
| PPY 1 | 6 | 2 | 2 |
| PPY 2 | 2 | 8 | 2 |
| PPY 3 | 6 | 8 | 5 |
| PPY 4 | 2 | 2 | 2 |
| PPY 5 | 4 | 5 | 3.5 |
| PPY 6 | 4 | 5 | 3.5 |
| PPY 7 | 2 | 2 | 5 |
| PPY 8 | 4 | 5 | 3.5 |
| PPY 9 | 6 | 8 | 2 |
| PPY 10 | 2 | 8 | 5 |
| PPY 11 | 6 | 2 | 5 |
| PPY 12 | 2 | 5 | 3.5 |
| PPY 13 | 4 | 2 | 3.5 |
| PPY 14 | 4 | 5 | 2 |

Experimental Conditions for PPY / Zr

* [Zr] g/L = [$K_2ZrF_6$] g/L;
** pH Adjusted with $H_2ZrF_6$ and/or $NH_4OH$

FIG. 4

| EXPERIMENT | Corrosion Score | |
|---|---|---|
| | 2024 T3 | 7075 T6 |
| PEDOT 1 | 3.0 | 3.0 |
| PEDOT 2 | 3.5 | 8.5 |
| PEDOT 3 | 1.0 | 3.5 |
| PEDOT 4 | 1.5 | 3.7 |
| PEDOT 5 | 4.0 | 9.0 |
| PEDOT 6 | 2.0 | 8.5 |
| PEDOT 7 | 2.0 | 3.5 |
| PEDOT 8 | 3.5 | 8.2 |
| PEDOT 9 | 3.5 | 9.0 |
| PEDOT 10 | 4.0 | 4.5 |
| PEDOT 11 | 8.0 | 2.7 |
| PEDOT 12 | 9.5 | 9.5 |
| PEDOT 13 | 2.5 | 5.5 |
| PEDOT 14 | 2.5 | 2.0 |
| ALODINE 1200S | 10 | 10 |

Experimental Results for PEDOT / Zr

FIG. 5

| EXPERIMENT | Corrosion Score | |
| --- | --- | --- |
| | 2024 T3 | 7075 T6 |
| PPY 1 | 1.0 | 1.50 |
| PPY 2 | 1.0 | 1.75 |
| PPY 3 | 4.0 | 5.0 |
| PPY 4 | 1.0 | 1.75 |
| PPY 5 | 5.0 | 5.5 |
| PPY 6 | 4.0 | 5.5 |
| PPY 7 | 4.0 | 4.5 |
| PPY 8 | 4.0 | 5.25 |
| PPY 9 | 0.75 | 1.75 |
| PPY 10 | 4.75 | 8.0 |
| PPY 11 | 2.5 | 6.0 |
| PPY 12 | 4.0 | 5.0 |
| PPY 13 | 3.0 | 4.0 |
| PPY 14 | 0.5 | 1.5 |
| ALODINE 1200s | 10 | 10 |

Experimental Results for PPY / Zr

FIG. 6

| COMPOUND | SHORT NAME | MOLECULAR FORMULA | STRUCTURAL FORMULA |
|---|---|---|---|
| (3-Glycidoxypropyl) trimethoxysilane | GPMS | $C_9H_{20}O_5Si$ | |
| 1,2-Bis(trimethoxysilyl) ethane | TMSE | $C_8H_{22}O_6Si_2$ | |
| 1,2-Bis(Triethoxysilyl) Ethane | BTSE | $[-CH_2Si(OC_2H_5)_3]_2$ | |
| Bis[3-(trimethoxysilyl) propyl]amine | BAS | $[(CH_3O)_3Si(CH_2)_3]_2NH$ | |
| Vinyltriacetoxy silane | VTAS | $(CH_3CO_2)_3SiCH=CH_2$ | |

FIG. 7

| PEDOT / Zr / Silane | | | | |
|---|---|---|---|---|
| Experiment | [PEDOT] (%) | [Zr] (g/L)* | [Silane] (% vol.) | pH** |
| PEDOT 15 | 0.43 | 5 | 0.10 GPMS | 3.5 |
| PEDOT 16 | 0.43 | 5 | 0.25 GPMS | 3.5 |
| PEDOT 17 | 0.15 | 5 | 0.10 GPMS | 3.5 |
| PEDOT 18 | 0.15 | 5 | 0.06 TMSE | 3.5 |

Experimental conditions for PEDOT/Zr/Silane

\* [Zr] g/L = [$K_2ZrF_6$] g/L;
\*\* pH Adjusted with $H_2ZrF_6$ and/or $NH_4OH$

FIG. 8

| PPY / Zr / Silane | | | | |
|---|---|---|---|---|
| Experiment | [PPY] (%) | [Zr] (g/L)* | [Silane] (% vol.) | pH** |
| PPY 15 | 0.25 | 5 | 0.10 GPMS | 3.5 |
| PPY 16 | 0.25 | 5 | 0.10 GPMS | 3.0 |
| PPY 17 | 0.25 | 5 | 0.05 GPMS | 3.0 |
| PPY 18 | 0.10 | 5 | 0.10 GPMS | 3.5 |
| PPY 19 | 0.50 | 5 | 0.10 GPMS | 3.5 |
| PPY 20 | 0.15 | 5 | 0.10 GPMS | 3.5 |
| PPY 21 | 0.25 | 5 | 0.25 GPMS | 3.5 |
| PPY 22 | 0.50 | 5 | 0.25 GPMS | 3.5 |
| PPY 23 | 0.25 | 5 | 0.06 TMSE | 3.5 |
| PPY 24 | 0.25 | 5 | 0.06 TMSE | 5.0 |
| PPY 25 | 0.25 | 5 | 0.15 TMSE | 3.5 |
| PPY 26 | 0.25 | 5 | 0.15 TMSE | 5.0 |
| PPY 27 | 2.0 | 8 | 0.06 TMSE | 5.0 |
| PPY 28 | 0.25 | 5 | 0.10 GPMS + 0.09 TMSE | 3.5 |
| PPY 29 | 0.25 | 8 | 0.06 TMSE | 3.5 |
| PPY 30 | 0.25 | 8 | 0.15 TMSE | 3.5 |
| PPY 31 | 0.25 | 8 | 0.10 GPMS + 0.09 TMSE | 3.5 |
| PPY 32 | 0.25 | 5 | 0.08 BTSE | 3.5 |
| PPY 33 | 0.25 | 5 | 0.08 BTSE | 5.0 |
| PPY 34 | 0.25 | 5 | 0.21 BTSE | 3.5 |
| PPY 35 | 0.25 | 5 | 0.21 BTSE | 5.0 |
| PPY 36 | 0.25 | 5 | 0.10 GPMS + 0.13 BTSE | 3.5 |
| PPY 37 | 0.25 | 8 | 0.08 BTSE | 3.5 |
| PPY 38 | 0.25 | 5 | 0.10 GPMS + 0.25 (BAS:VTAS 4:1 vol.) | 3.0 |
| PPY 39 | 0.25 | 5 | 0.25 BAS:VTAS 4:1 vol. | 3.0 |
| PPY 40 | 0.25 | 5 | 0.10 GPMS + 0.05 TMSE | 3.0 |
| PPY 41 | 0.25 | 5 | 0.10 GPMS + 0.10 TMSE | 3.0 |
| PPY 42 | 0.25 | 5 | 0.10 GPMS + 0.15 TMSE | 3.0 |
| PPY 43 | 0.25 | 5 | 0.10 BTSE | 3.0 |
| PPY 44 | 0.25 | 5 | 0.25 BTSE | 3.0 |
| PPY 45 | 0.25 | 5 | 0.25 BTSE | 2.5 |
| PPY 46 | 0.25 | 5 | 0.05 GPMS + 0.15 TMSE | 3.0 |
| PPY 47 | 0.25 | 5 | 0.10 GPMS + 0.20 TMSE | 3.0 |

Experimental conditions for PPY/Zr/Silane

\* [Zr] g/L = [$K_2ZrF_6$] g/L;
\*\* pH Adjusted with $H_2ZrF_6$ and/or $NH_4OH$

FIG. 9

| EXPERIMENT | CORROSION SCORE | | ADHESION SCORE | | SURFACE CONTACT ELECTRICAL RESISTANCE (mohm/sq inch) | | |
| --- | --- | --- | --- | --- | --- | --- | --- |
| | 2024 T3 | 7075 T6 | 2024 T3 | 7075 T6 | 2024 T3 | 7075 T6 | 6061 T6 |
| PEDOT 12 | 9.5 | 9.5 | 0 | 0 | 2.21 | 1.29 | 0.23 |
| PEDOT 15 | 4.0 | 7.8 | 1.60 | 2.15 | - | - | - |
| PEDOT 16 | 4.0 | 7.5 | 8.65 | 7.80 | - | - | - |
| PEDOT 17 | 6.4 | 9.4 | 9.70 | 9.70 | - | - | - |
| PEDOT 18 | - | 8.0 | - | 9.65 | - | - | - |
| Alodine 1200S | 10.0 | 10.0 | 10.0 | 10.0 | 0,71 | 0,86 | X |

Experimental results for PEDOT/Zr/Silane

FIG. 10

| EXPERIMENT | CORROSION SCORE | | ADHESION SCORE | | SURFACE CONTACT ELECTRICAL RESISTANCE (mohm/sq inch) | | |
|---|---|---|---|---|---|---|---|
| | 2024 T3 | 7075 T6 | 2024 T3 | 7075 T6 | 2024 T3 | 7075 T6 | 6061 T6 |
| PPY 10 | 4.75 | 8.0 | 0 | 0 | 1.21 | 2.06 | 0.42 |
| PPY 15 | - | 9.0 | - | 9.8 | - | - | 0.69 |
| PPY 16 | 7.2 | 8.7 | 9.75 | 9.8 | - | - | - |
| PPY 17 | - | 9.3 | - | 9.8 | - | - | - |
| PPY 18 | 5.0 | 8.2 | 9.8 | 9.8 | - | - | - |
| PPY 19 | 6.2 | 8.5 | 4.05 | 8.05 | - | - | - |
| PPY 20 | 7.0 | 8.0 | 9.8 | 9.8 | - | - | - |
| PPY 21 | 4.6 | 7.6 | 9.75 | 9.8 | - | - | - |
| PPY 22 | 5.3 | 7.3 | 5.1 | 8.5 | - | - | - |
| PPY 23 | - | 9.0 | - | 9.7 | - | - | - |
| PPY 24 | - | 9.5 | - | 9.45 | - | - | - |
| PPY 25 | - | 9.3 | - | 9.6 | - | - | - |
| PPY 26 | - | 8.5 | - | 9.5 | - | - | - |
| PPY 27 | - | 8.5 | - | 7.05 | - | - | - |
| PPY 28 | - | 9.2 | - | 9.8 | - | - | - |
| PPY 29 | - | 8.8 | - | 9.75 | - | - | - |
| PPY 30 | - | 8.5 | - | 9.75 | - | - | - |
| PPY 31 | - | 8.7 | - | 9.75 | - | - | - |
| PPY 32 | - | 8.4 | - | 9.75 | - | - | - |
| PPY 33 | - | 9.0 | - | 9.7 | - | - | - |
| PPY 34 | - | 8.5 | - | 9.7 | - | - | - |
| PPY 35 | - | 8.6 | - | 9.55 | - | - | - |
| PPY 36 | - | 8.0 | - | 9.7 | - | - | - |
| PPY 37 | - | 9.0 | - | 9.75 | - | - | - |
| PPY 38 | - | < 9.3 | - | 9.8 | - | - | - |
| PPY 39 | - | < 9.3 | - | 9.8 | - | - | - |
| PPY 40 | - | < 9.3 | - | 9.8 | - | - | - |
| PPY 41 | - | < 9.3 | - | 9.8 | - | - | - |
| PPY 42 | - | 9.3 | - | 9.75 | - | - | - |
| PPY 43 | - | < 9.3 | - | 9.8 | - | - | - |
| PPY 44 | - | < 9.3 | - | 9.8 | - | - | - |
| PPY 45 | - | < 9.3 | - | 8.65 | - | - | - |
| PPY 46 | - | < 9.3 | - | 9.8 | - | - | - |
| PPY 47 | - | < 9.3 | - | 9.8 | - | - | - |
| Alodine 120 | 10.0 | 10.0 | 10.0 | 10.0 | 0,71 | 0,86 | X |

Experimental results for PPY/Zr/Silane

FIG. 11

CHROMIUM-FREE CONVERSION COATING

CROSS-REFERENCE TO RELATED APPLICATIONS

The present application claims priority to and is based on EP patent application number EP12382337.9, filed Aug. 31, 2012, entitled CHROMIUM-FREE CONVERSION COATING, which is incorporated herein by reference; the present application is also a continuation-in-part application of pending U.S. application Ser. No. 12/442,104, filed Apr. 7, 2009, entitled CHROMIUM-FREE CONVERSION COATING, which U.S. application Ser. No. 12/442,104 claims priority to International Application Number PCT/US2007/016681, filed Jul. 24, 2007, which is based on EP patent application number EP06380228.4, filed Aug. 8, 2006, all of which are incorporated herein by reference.

FIELD OF THE DISCLOSURE

This invention relates generally to the field of coatings and corrosion control on metals, and in particular to a chromium-free conversion coating for aircraft applications.

BACKGROUND

Corrosion is defined as the chemical or electrochemical reaction between a material, usually a metal, and its environment that produces a deterioration of the material and its properties.

Corrosive attack begins on the surface of the metal. The corrosion process involves two chemical changes. The metal that is attacked or oxidized undergoes an anodic change, with the corrosive agent being reduced and undergoing a cathodic change. The tendency of most metals to corrode creates one of the major problems in the maintenance of aircraft, particularly in areas where adverse environmental or weather conditions exist.

Chromium-based anti-corrosive systems containing hexavalent chromium compounds have proven to be an extremely useful and versatile group of chemistries that are extensively used in aircraft metal treatment processes. They impart many beneficial and essential anti-corrosive characteristics to metallic substrates on which they are applied and have been used extensively for the pre-treatment of metals before coating, adhesive bonding and surface finishing.

Chemically, chromium-based anti-corrosive systems have involved the combination(s) of hexavalent chromium (e.g., $CrO_3$, $CrO_4^{2-}$, $Cr_2O_7^{2-}$) and hydrofluoric acid (HF) in the case of aluminum and its alloys. The hydrofluoric acid removes oxide film from the surface of the metallic substrate (e.g., aluminum) and the hexavalent chromium reacts with the exposed metal and a trivalent chromium oxide precipitates. Using aluminum as an example:

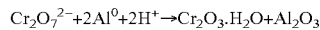

$$Cr_2O_7^{2-} + 2Al^0 + 2H^+ \rightarrow Cr_2O_3 \cdot H_2O + Al_2O_3$$

Chromium oxide such as that produced according to the above reaction is quite useful in anti-corrosive applications. It is quite stable in alkaline environments, it is water repellant (hydrophobic) and may act as a barrier coating towards water. Finally, it exhibits a "self-healing effect"—that is, residual hexavalent chromium in the coating may react with damaged areas of the coating—thereby producing more trivalent chromium oxide at damaged sites and therefore "healing" itself.

Consequently, chromium-based, and in particular hexavalent chromium-based systems have been extensively used in the aircraft industry because they have proven to be: highly effective at preventing corrosion and as an adhesion promoter for organic coatings and adhesives; particularly resilient as the application/treatment process exhibits a low sensitivity towards variation in process conditions; extremely effective on most/all aluminum alloys; and ensure considerable quality control characteristics as a skilled worker may tell the amount of chromium on the surface of a substrate by mere inspection (color) of the coating.

Concern about chromium—and in particular hexavalent chromium—in the environment has generated a need to replace chromium-based systems. Hexavalent chromium salts are classified as hazardous substances (toxic, sensitizing and carcinogenic) consequently they are environmentally and toxicologically undesirable. The European Parliament has published directives requiring the elimination of hexavalent chromium such as directive 2002/95/EC for electrical and electronic equipment and directive 2000/53/EC for the automotive sector. Therefore "environmentally friendly", commercially acceptable alternative to chromium-based systems are highly desirable.

Prior art attempts to provide chromium-free coatings have met with limited success. For example, R. J. Racicot and S. C. Yang describe and compare the corrosion resistance performance of a polyaniline based conductive polymer coating versus a chromate conversion coating on two aluminum alloys in a paper entitled "CORROSION PROTECTION COMPARISON OF A CHROMATE CONVERSION COATING TO A NOVEL CONDUCTIVE POLYMER COATING ON ALUMINUM ALLOYS", which was presented at CORROSION 97, paper 531, pp. 531/1-531/7, Houston, Tex., 1997. As disclosed by the authors, the double strand polyaniline exhibited limited corrosion protection for aluminum alloys AA2024-T3 and AA7075-T6 in salt-spray and salt and acid immersion tests.

The double strand polyaniline employed is a molecular complex of two polymers, polyaniline and a second polyanion. The two linear polymers are bonded non-covalently in a side-by-side fashion to form a stable molecular complex. As noted by the authors, the advantages to such double strand complexes is: 1) that the conductive state of the polymer is very stable; 2) with proper choice of the polymeric dopant, the conductive polymer may be dispersed in solvents and used as a coating material; and 3) the polymeric dopant provides sites for functionalization to achieve good adhesion to metal surfaces.

I. Paloumpa, A. Yfantis, P. Hoffmann, Y. Burkov, D. Yfantis and D. Schmeiber describe, in a paper entitled "MECHANISMS TO INHIBIT CORROSION OF Al ALLOYS BY POLYMERIC CONVERSION COATINGS", which appeared in *Surface and Coatings Technology*, 180-181, pp. 308-312, 2004, describe a polypyrrole-based coating which can be formed on an aluminum surface from an aqueous polypyrrole (PPY) chemisorbed on titanium and zinc oxides and exhibits advanced corrosion resistance.

U.S. Pat. No. 5,342,456 to Dolan on Aug. 30, 1994, describes a "PROCESS FOR COATING METAL SURFACES TO PROTECT AGAINST CORROSION" wherein a chromium-free conversion coating can be formed on metals—particularly galvanized steel, by dry-in-place aqueous acidic liquids. The liquid comprises a component of anions, particularly at least four fluorine atoms and at least one atom from a group consisting of titanium, zirconium, hafnium, silicon, and boron and optionally, one or more oxygen atoms. Additional cations from the group consisting of cobalt, magnesium, manganese, zinc, nickel, tin, zirconium, iron, aluminum and copper, a sufficient free acid to give a pH in the range of 0.5 to 5.0 and optionally a compound that will form an organic resinous film upon drying in place.

A "CORROSION RESISTANT ALUMINUM ARTICLE COATED WITH EMERALDINE BASE POLYANILINE", was described in a U.S. Pat. No. 5,928,795 which issued to Spellane et al on Jul. 27, 1999. The polyaniline used as the coating was a well-known emeraldine base form and is easily formed by the oxidative polymerization of aniline in excess hydrochloric acid by ammonium persulfate followed by treatment with ammonium hydroxide.

U.S. Pat. No. 5,980,723 which issued to Runge-Marchese et al. on Nov. 9, 1999, describes an "ELECTROCHEMICAL DEPOSITION OF A COMPOSITE POLYMER METAL OXIDE", which is a process for forming polymer films through electrochemical techniques utilizing electrolytes which include conductive polymer. The resulting polymer films described are electrically conductive and corrosion and wear resistant. Example polymer films included polyaminobenzene (polyaniline).

An aqueous liquid surface treatment composition having a pH value not more than 6.5 and containing phosphoric acid ions, condensed phosphoric acid ions, an oxidizing agent and a water-soluble polymer was described in U.S. Pat. No. 6,153,022 which issued to Yoshida on Nov. 28, 2000. The patentee therein reports that such coating rapidly forms on the surface of a metal, a conversion coating that has good corrosion resistance and adhesion to subsequently applied organic coatings such as paint and is less easily damaged by mechanical stresses than prior art conversion coatings.

"ELECTROACTIVE POLYMER COATINGS FOR CORROSION CONTROL" were described in U.S. Pat. No. 6,150,032, which issued to Yang et al. on Nov. 21, 2000. In that patent, the patentees describe an anti-corrosive polymeric complex which comprises a plurality of double-stranded molecular complexes including conductive polymer and a strand of a copolymer. The strands of the polymeric complex are non-covalently bonded to each other along the contour of the strands to form a side-by-side, twisted, double-stranded configuration.

U.S. Pat. No. 6,328,874, issued to Kinlen et al on Dec. 11, 2001 for "ANODICALLY FORMED INTRINSICALLY CONDUCTIVE POLYMER-ALUMINUM OXIDE COMPOSITE AS A COATING ON ALUMINUM", describes a method for forming a coating on aluminum by contacting the aluminum with water, at least one multifunctional polymeric organic acid, a monomer of an intrinsically conductive polymer (ICP) and polymerizing the ICP monomer and forming aluminum oxide by imposing an electrical potential between the aluminum surface as an anode and a cathode. The intrinsically conductive polymer salt and aluminum oxide coating that is formed resists corrosion and is resistant to de-doping during immersion in hot water.

A "NONCHROMATE RUST PREVENTIVE AGENT FOR ALUMINUM, METHOD OF RUST PREVENTION AND RUST-PREVENTIVE ALUMINUM PRODUCTS" was described in U.S. Pat. No. 6,419,731, which issued to Inbe et al. on Jul. 16, 2002. The patentees therein describe a nonchromate rust preventive agent for aluminum that comprises a zirconium compound, a fluoride ion, a water soluble resin and an aluminum salt.

Sako et al., in U.S. Pat. No. 6,736,908, entitled "COMPOSITION AND PROCESS FOR TREATING METAL SURFACES AND RESULTING ARTICLE", which issued on May 18, 2004, describes a metal treating composition comprising at least a specific type of dissolved and/or dispersed organic resin, a dissolved vanadium compound in which the valence of the vanadium is from 3 to 5, and a dissolved compound that contains at least one of the metals Zr (zirconium), Ti (titanium), Mo (molybdenum), W (tungsten), Mn (manganese), and Ce (cerium). According to the patentees, the treatment provides metal surfaces with superior corrosion resistance, alkali resistance, and fingerprint resistance. Advantageously, their composition contains no chromium.

U.S. Pat. No. 6,758,916 for "COMPOSITION AND PROCESS FOR TREATING METALS", issued to David McCormick on Jul. 6, 2004, describes a chromium-free conversion coating at least equivalent in corrosion protective quality to conventional chromate conversions that can be formed on metals, particularly cold rolled steel, by dry-in-place aqueous acidic liquid. The liquid has a pH value between 0.5 and 5.0 and comprises "fluorometallate" anions consisting of at least four fluorine atoms; at least one atom of an element selected from the group consisting of titanium, zirconium, hafnium, silicon, aluminum, and boron, and optionally, one or more of ionizable hydrogen atoms and oxygen atoms; a component of divalent or tetravalent cations of elements selected from the group consisting of cobalt, magnesium, manganese, zinc, nickel, tin, copper, zirconium, iron, and strontium—in very precise relative proportions.

Despite the developments of the prior art, the corrosion resistance imparted by non-chromate type treatments is invariably less than that provided by chromate type methods and agents and has not satisfied practical needs—particularly those in the aircraft industries. The disclosure provides a chromium-free coating which, despite being chromium-free, is capable of providing corrosion protection equivalent to or superior than a chromium-type coating, or at least to provide a commercially viable alternative to known coatings.

Wim J. Van Ooij et al. described, in a paper entitled "Modified silane coatings as an alternative to chromates for corrosion protection of aluminum alloys", which was published in *Silanes and Other Coupling Agents*, Vol. 3, pp 135-159, Ed. K. L. Mittal, 2004, bis-(3-triethoxysilylpropyl) tetrasulfide, bis-(trimethoxysilylpropyl)amine and vinyltriacetoxysilane based treatments applied onto AA2024-T3 alloys which also incorporated cerium nitrate, tolytriazole and benzotriazole corrosion inhibitors and silica nanoparticles. Self-healing effects were reported for some of the treatments as well as good paint adhesion performance.

Wim J. Van Ooij et al. described, in a paper entitled "Overview: The Potential of silanes for chromate replacement in metal finishing industries" which was published in *Silicon Chemistry*, Volume 3, Numbers 1-2 (2006), that bis-(3-triethoxysilylpropyl) tetrasulfide treated 7075-T6 panels did not exhibit any sign of corrosion after 336 hours of salt spray exposure.

It is known that alcohol-based silanes offer a higher corrosion resistance to the water-based silane systems as the higher alcohol content removes more water from the film upon drying and the silanol groups can react more easily to form a cross-linked and denser film. Also, the water-soluble silanes remain more hydrophilic even after drying, so they allow higher ingress of water than the solvent-based silanes. It is therefore important that these low-VOC (volatile organic compound) water-based silanes systems are further modified to increase their corrosion inhibition efficiency. In the publication "Effects of addition of corrosion inhibitors to silane films on the performance of AA2024-T3 in a 0.5M NaCl solution", by Wim J. Van Ooij et al., which was published in *Progress in Organic Coatings*, 53 (2005) 153-

168, corrosion inhibitors (tolytriazole, benzotriazole and inorganic cerium salts) were added to silane films and their corrosion properties studied in 0.5 M NaCl (sodium chloride) solution. The water-based silane solutions were prepared by mixing Bis[3-(trimethoxysilyl)propyl]amine and Vinyltriacetoxysilane in 2:1 and 4:1 parts by volume and about 5% of this mixture was hydrolyzed with 95% of DI (deionized) water. Silane films when loaded with organic or inorganic inhibitors provided improved corrosion resistance. A scratch cell test confirmed that the cerium salts were also potential inhibitors for adding self-healing capabilities for silane films.

The publication "A comparative study on the corrosion resistance of AA2024-T3 substrates pre-treated with different silane solutions", by A. M. Cabral et al. that was published in *Progress in Organic Coatings*, 54 (2005) 322-331, reported a comparative study of AA-2024-T3 pretreated with three different silane solutions (1,2-Bis(Triethoxysilyl) Ethane, bis-(3-triethoxysilylpropyl)tetrasulfide and γ-mercaptopropyltrimethoxysilane). The silane treated samples were further treated with γ-aminopropyltrimethoxy silane prior to painting them with a polyurethane enamel. The AC (alternating current) impedance results showed that silane films provided protection to the substrate. For a short time, the performance was even better than that conferred by the chromate reference treatment.

J. B. Bajat et al. described, in a paper entitled, "Corrosion stability of epoxy coatings on aluminum pretreated by vinyltriethoxysilane", which was published in *Corrosion Science*, 50 (2008) 2078-2084, the electrochemical and transport properties and adhesion of epoxy coatings electrodeposited on aluminum 99.7 pretreated by vinyltriethoxyslane (VTES). It was concluded that 5% solution for 10 minutes provided enhanced adhesion and also improved the corrosion stability of a protective system VTES/epoxy coating. The same authors reported, in a publication entitled, "Corrosion protection of aluminium pretreated by vinyltriethoxysilane in sodium chloride solution", which was published in *Corrosion Science*, 52 (2010) 1060-1069, EIS and potential-time measurements of VTES films deposited on A199.5% substrates in 3% NaCl (sodium chloride) medium exposure. It was shown that the concentration of VTES had a great influence on the corrosion behavior and morphology of the VTES films while curing time exhibited smaller influence of the VTES film properties.

B. Naderi Zand et al. described, in a paper entitled, "Corrosion and adhesion study of polyurethane coating on silane pretreated aluminium", which was published in *Surface & Coatings Technology*, 203 (2009) 1677-1681, the effect of the silane pretreatment's pH on the adhesion strength and on the corrosion protection of subsequent polyurethane (PU) coating on aluminum alloy substrate. The practical adhesion of the coating on the substrate was measured in dry, wet and recovered states via pull-off method for desmutted, chromated and vinyltrimethoxysilane (VTMS) pretreated AA1050 aluminum alloy. VTMS resulted in good adhesion performance in dry, wet and recovered states at pH<isoelectric point (IEP). Corrosion protection of PU coating was studied with EIS and salt spray in the presence of silane layer. At pH<IEP protective performance was considerably higher and comparable with that of chromated specimens.

F. Brusciotti et al. described, in a paper entitled, "Characterization of thin water-based silane pre-treatments on aluminium with the incorporation of nano-dispersed $CeO_2$ particles", which was published in *Surface & Coatings Technology*, 205 (2010) 603-613, novel thin films of water-based 1,2-bis(Triethoxysilyl)ethane (BTSE) with the incorporation of nano-dispersed $CeO_2$ particles for improved barrier properties. EIS investigations pointed out a better performance for the coatings where the $CeO_2$ particles were nano-dispersed and uniformly distributed in the layer.

U.S. Pat. No. 6,071,566 which was issued to Kevon Brown et al., relates to a method that comprises applying a solution containing one or more vinyl silanes with or more multi-silyl-functional silanes for treating a metal substrate providing corrosion resistance. The method is particularly suitable for use in zinc coated surfaces. The particular preferred vinyl silane is vinyltriethoxysilane (VS) and the preferred multi-functional silane is 1,2-bis(triethoxysilyl) ethane (BTSE).

Accordingly, the disclosure provides for tackling the disadvantages associated with known art, to provide a chromium-free coating with improved adhesion properties, or at least to provide a commercially viable alternative to known coatings.

SUMMARY

In a first aspect, there is disclosed a process for treatment of metallic surfaces. The process comprises the steps of: pre-treating the surfaces; coating the surfaces with a conversion coating by contacting them with a conducting polymer dispersion containing: one or more silanes, and inorganic metallic salts selected from at least one of molybdenum, magnesium, zirconium, titanium, vanadium, cerium, hafnium, silicon, aluminum, boron, cobalt and zinc in concentrations of the metal salt between 2.0 g/L and 20 g/L and a pH value of between 1 and 6.0; and drying the surfaces.

In the following passages different aspects/embodiments are defined in more detail. Each aspect/embodiment so defined may be combined with any other aspect/embodiment or aspects/embodiments unless clearly indicated to the contrary. In particular, any feature indicated as being preferred or advantageous may be combined with any other feature or features indicated as being preferred or advantageous.

Chemical conversion coatings must perform a dual function: to improve the corrosion resistance of the substrate alloy and to promote a good adhesion of the subsequent organic coatings. Additionally, these coatings can be used in parts where surface contact electrical resistance is also a requirement (the maximum electrical resistance values allowed by the MIL-DTL-81706-B standard are 5000 μΩ/square inch before the salt spray exposure test and 10000 μΩ/square inch after 168 h of salt spray exposure test under an applied electrode pressure of 200 pound per square inch (psi). Individual readings not greater than 20% in excess of the specified maximums shall be acceptable, provided that the average of all readings does not exceed the specified maximum resistance).

New processes and compositions for chromium-free conversion coatings with good corrosion resistance were disclosed in United States Patent Application Publication Number US 2010/0009083. The conversion coatings described in United States Patent Application Publication Number US 2010/0009083 showed very good corrosion performance. However, it has been discovered that the adhesion of these coatings may be improved to subsequent organic coatings without jeopardizing the corrosion protection.

Indeed, the inclusion of a silane in the coating of United States Patent Application Publication Number US2010/0009083 has been found to provide a significant improvement. The conducting polymer dispersion described in United States Patent Application Publication Number US2010/0009083 comprises at least one silane compound apart from the other bath components (conducting polymer and inorganic salts). The silane compounds enhance the adhesion performance so the coatings comply with the requirements of aeronautical applications while the corrosion protection as described in the examples is maintained.

Moreover, the new conversion coatings obtained with the conducting polymer dispersions comprising at least one silane compound offer low surface contact electrical resistance, compliant with the requirements for aeronautical applications.

The process and composition has now been optimized in order to enhance the adhesion of the subsequent organic coatings, while maintaining the corrosion protection of the substrate. Additionally, the coatings obtained with these processes based on compositions comprising at least one silane compound have proven to have low contact electrical surface resistance, compliant with the requirements for aeronautical applications.

The challenge has been to optimize the chemical conversion process and the coating composition to enhance the adhesion and reduce the electrical resistance without jeopardizing the corrosion protection.

In the process of silane treatment of metals, two main reactions occur on the basis of the number of silanols (SiOH) after the silane molecules are adsorbed onto the metal surface. On the one hand, the condensation between silanols (SiOH) from the silane solution and the metal hydroxyls (MeOH) from the metal surface hydroxides forms metallosiloxane bonds (MeOSi). On the other hand, the condensation among the excess SiOH groups adsorbed on the metals forms a siloxane (SiOSi) film on the top of the coating.

Preferably, a medium may be used for silane solution preparation; silanes may be classified as water-based or solvent-based silanes. It is desirable to use water-based silane systems with zero or very little alcohol content, due to VOC (volatile organic compound) restrictions. Preferably the one or more silanes are water soluble.

Preferably, the one or more silanes are present in an amount of from 0.01 v % to 1.0 v % (v/v) of the polymer dispersion, more preferably from 0.1 v % to 0.5 v %. With this range of silane content the beneficial effects of the silane are observed, without compromising the corrosion resistance.

Preferably, the one or more silanes are of the formula:

$$YSiX_{(3-a)}Z_a$$

wherein X are independently selected hydrolysable groups, Y is non-hydrolysable and includes a functional group, Z is independently selected from H or alkyl, and a is 0, 1 or 2.

By "hydrolysable group" it is meant that the group is susceptible to nucleophilic attack to cleave the group from the silicon atom. X are independently selected hydrolysable groups. It is preferred that the hydrolysable groups are selected from methoxy ($OCH_3$) or ethoxy ($OC_2H_5$). These groups allow for good adhesion of the compound to nucleophilic sites on the metal and/or further coatings.

By "non-hydrolysable" it is meant that the group is not susceptible to nucleophilic attack to cleave the group from the silicon atom. Preferably the Y moiety is joined to the silicon atom by a silicon-carbon bond.

Y includes a functional group. That is, Y includes a group capable of reacting to link the silicon atom to a further coating, a further silane or to the metal substrate. The functional group is preferably selected from vinyl ($-CH=CH_2$), amino ($-NH_2$), epoxy or mercapto ($-SH$).

The functional group may consist of this functional group, but preferably the functional group is linked to the silicon atom by an alkyl chain, preferably a lower alkyl ($C_1$-$C_6$) chain, an alkyl ether group or an alkyl amine group. Thus, for example, Y may preferably be: $-(CH_2)_n-NH_2$; $-(CH_2)_n-SH$, or $-(CH_2)_n-HC=CH_2$, and n is preferably 0-6, preferably 1-6, more preferably 0-3.

In one embodiment, the functional group may be a further silicon-containing moiety. Thus, Y may be $-RSiX_{3-a}Z_a$, where X, Z and a are as defined above. R may be an alkyl, an ether or an alkylamine. For example, R is an ether, such as $CH_2OCH_2$ or R is an amine, such as $(CH_2)_3NH(CH_2)_3$. According to their chemical structures, silane molecules are divided into two major categories, mono-silanes and bis-silanes. Bis-type silanes have two silicon atoms in their molecule whereas mono-silanes have only one, with a general formula of $X_3Si-R-SiX_3$. Preferably the silane is symmetrical in this way for ease of synthesis and to minimize production costs. The main difference between mono and bis-silanes is that the number of hydrolysable X groups is double in a bis-silane molecule than in a mono-silane molecule. Thus, it is reported that bis-silanes offer stronger interfacial adhesion (with the substrate) and denser films leading to better corrosion performance compared to mono-silanes, especially in unpainted state.

By "alkyl" is meant a straight or branched chain saturated cyclic (i.e., cycloalkyl) or acyclic hydrocarbon group of from 1 to 12 carbons, unless otherwise specified. Exemplary alkyl groups include $C_1$-$C_8$, $C_1$-$C_6$, $C_1$-C4, $C_2$-$C_7$, $C_3$-$C_{12}$, and $C_3$-$C_6$ alkyl. Specific examples include methyl, ethyl, 1-propyl, 2-propyl, 2-methyl-1-propyl, 1-butyl, 2-butyl, and the like. Unless otherwise noted, alkyl groups, used in any context herein, may optionally be substituted with halogen, amino or sulfyl groups, or may include one or more heteroatoms in the alkyl chain, such as oxygen (an ether) or nitrogen (an amine).

Z is independently selected from H (hydrogen) or alkyl. That is, Z is a non-hydrolysable group that does not include a functional group for linking the silane to a further coating, a further silane or to the metal substrate. In particular, it is preferred that a is 0 (zero).

Preferably, the one or more silanes are selected from (3-Glycidoxypropyl) trimethoxysilane (GPMS), 1,2-Bis (trimethoxysilyl)ethane (TMSE), 1,2-Bis(Triethoxysilyl) Ethane (BTSE), Bis[3-(trimethoxysilyl)propyl]amine (BAS) and Vinyltriacetoxysilane (VTAS), or combinations of two or more thereof.

Preferably, said conducting polymer is one selected from the group consisting of: polyaniline (PANI), polyethylene-dioxythiophene (PEDOT) and polypyrrole (PPY).

Preferably, the coating step is applied to the surfaces by spraying, or immersion. If the coating step is immersion, preferably it is for a period of substantially 2 (two) minutes in the treatment bath. Preferably, said drying step is performed at substantially room temperature.

The pretreatment step serves to prepare the surface of the metal for the coating. Accordingly, the pretreatment step at least involves the cleaning of the surface. Preferably said pretreatment step further comprises the steps of: degreasing the surfaces; cleaning the surfaces; and deoxidizing the surfaces.

Preferably, the method further comprises the steps of: rinsing the surfaces after cleaning; and rinsing the surfaces after deoxidizing; and not-rinsing the surfaces after coating.

Preferably, the inorganic metal salt is or comprises a salt of zirconium, the concentration of inorganic metallic salts of zirconium are produced with $K_2ZrF_6$ (potassium hexafluorozirconate) and the pH is adjusted with $H_2ZrF_6$ (fluorozirconic acid) and/or $NH_4OH$ (ammonium hydroxide).

Preferably, said metallic sheets are ones selected from the group consisting of aluminum, copper, iron, or alloys thereof, and preferably is selected from the group consisting of 2024-T3 and 7075-T6.

Preferably, the inorganic salts are present in a concentration of between 2.0 g/L and 8.0 g/L (grams per liter) and/or wherein the contacting step is carried out at a pH of 2 to 5.

According to a second aspect, there is provided a conversion coating for the treatment of metallic surfaces, said coating comprising one or more silanes, and a conducting polymer dispersion containing an inorganic metallic salt of at least one of molybdenum, magnesium, zirconium, titanium, vanadium, cerium, hafnium, silicon, aluminum, boron, cobalt and zinc, wherein the concentration of the inorganic metallic salt is between 2.0 g/L and 20 g/L and the pH of the coating is between 1 and 6.0.

Preferably, the one or more silanes are as described above and as discussed herein.

Preferably, the conducting polymer is one selected from the group consisting of: polyaniline (PANI), polyethylenedioxythiophene (PEDOT) and polypyrrole (PPY), and/or wherein the one or more silanes are selected from (3-Glycidoxypropyl)trimethoxysilane (GPMS), 1,2-Bis(trimethoxysilyl)ethane (TMSE), 1, 2-Bis(Triethoxysilyl) Ethane (BTSE), Bis[3-(trimethoxysilyl)propyl]amine (BAS) and Vinyltriacetoxysilane (VTAS), or combinations of two or more thereof.

These and other features and advantages of the disclosure will become apparent with reference to the attached drawing and detailed description.

BRIEF DESCRIPTION OF THE DRAWINGS

A more complete understanding of the disclosure may be realized by reference to the accompanying drawings in which:

FIG. 2 is a table that shows the properties of several conducting polymers used in the disclosure according to data provided by suppliers of the polymers;

FIG. 3 is a table that shows the experimental conditions for PEDOT/Zr for both tested alloys according to the disclosure;

FIG. 4 is a table that shows the experimental conditions for PPY/Zr for both tested alloys according to the disclosure;

FIG. 5 is a table that shows the measured corrosion of alloys treated with PEDOT/Zr according to the disclosure;

FIG. 6 is a table that shows the measured corrosion of selected alloys treated with PPY/Zr according to the disclosure;

FIG. 7 is a table that shows the molecular and structural formula of several silanes used in the disclosure;

FIG. 8 is a table that shows the experimental conditions for PEDOT/Zr/silane for both tested alloys according to the disclosure;

FIG. 9 is a table that shows the experimental conditions for PPY/Zr/silane for both tested alloys according to the disclosure;

FIG. 10 is a table that shows the measured corrosion, adhesion and surface contact electrical resistance of alloys treated with PEDOT/Zr according to the disclosure; and, FIG. 11 is a table that shows the measured corrosion, adhesion and surface contact electrical resistance of alloys treated with PPY/Zr according to the disclosure.

DETAILED DESCRIPTION

Figure 1:
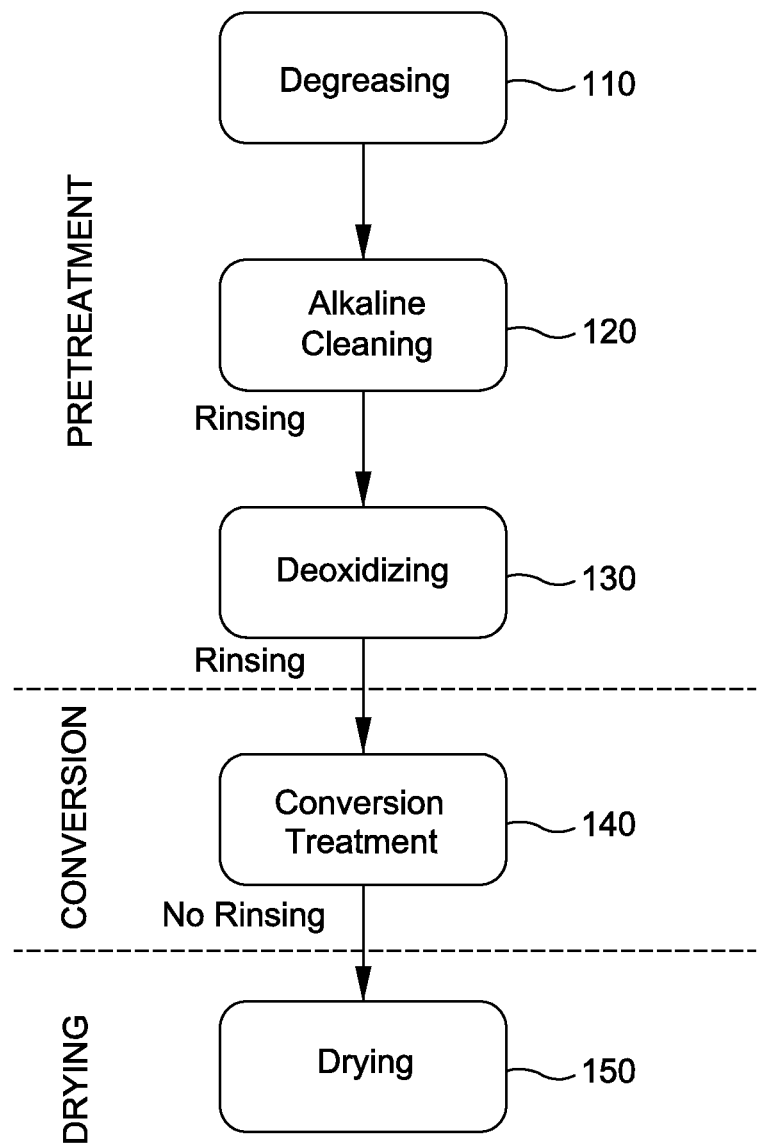
FIG. 1 is a process flow chart depicting the steps associated with the chromium-free conversion coating of the disclosure.

As can be appreciated by those skilled in the art, chemical conversion surface treatments/coatings generally involve the process of immersion or other contact of a metal (e.g., aluminum and/or alloys of aluminum) with an active bath or spray that—through a redox reaction at the metallic surface or chemical deposition at the metallic surface due to physicochemical changes in the treatment bath—form a superficial adhered protective coating. Such conversion coatings typically exhibit quite low solubility and—in the case of aluminum—a thickness of approximately 20 nm (nanometer) to 1 mm (millimeter), depending upon the process parameters and the alloy treated, while the substrate thickness lost is quite small or minimal. The color of the resulting conversion coating obtained depends upon the base material and the bath/spray parameters.

Advantageously, the conversion coating may be prepared in a single-step immersion process. Accordingly, parts, e.g., panels, to be coated are bathed in a conducting polymer dispersion in which different inorganic salts and silanes along with other additives that affect the bath and/or resulting coating, e.g., bath dispersion agents, wetting agents, or polymeric film formation agents.

FIG. 1 depicts an overview of the steps involved in the process. More particularly, the process includes three general phases or steps namely, pretreatment, conversion, and drying. And while the discussion herein is concerned primarily with aluminum and certain specific alloys of aluminum, the disclosure is not so limited. In particular, different metal compositions and alloys as well as additional applications, e.g., automotive, industrial, etc., would benefit from the disclosed process or method and resulting coating as well.

Returning now to FIG. 1, it may be observed that pretreatment begins with step 110 by degreasing the panels to be coated. Degreasing may be performed using any of a variety of known detergent solutions and/or organic solvents. Additionally, such degreasing—like all of the process steps—may be performed by spray application or bath/immersion or a mixture of the two techniques.

Once the panel(s) to be coated is degreased, it is then cleaned/washed with an alkali solution with step 120 of alkaline cleaning. Such alkali solutions are commercially available under various trade names e.g., TURCO (4215NCLT), and this alkali cleaning/washing is advantageously performed for approximately 10 (ten) minutes at a modest elevated temperature, e.g., 50° C. (degrees Celsius). After cleaning/washing, the panel is rinsed with water and then deoxidized with step 130 of deoxidizing, with, for example TURCO Smut Go NC for approximately 5 (five) minutes at ambient temperature(s) and then rinsed. Advantageously, other pickling or desmutting steps can be used depending on the treated substrate material and surface material or thickness to be removed.

As can be now appreciated, the process employs commercially available pretreatment steps which are well known and understood. Advantageously, such pretreatment is compatible with a variety of alloys and their application is widely understood.

In an exemplary embodiment, step 140 of conversion treatment includes immersion of aluminum alloy panels in a bath for a period of time followed by direct (no rinse) step 150 of drying of the treated panels. Generally, the conversion treatment bath is prepared by an initial stirring of a conducting, polymeric dispersion. Advantageously, the polymer dispersion(s) used may be commercially available water-based ones and exhibit satisfactory formulation(s) including solid content, pH, and dispersive additives. Consequently, only a minimal amount of stirring is required for these commercial dispersions. Of further advantage, the conversion treatment in the bath is only a 2 (two) minute process.

Such conducting polymeric dispersions include Polyanaline (PANI), Polyethylenedioxythiophene (PEDOT) and Polypyrrole (PPY) among others. The particular conducting polymeric dispersions used in our examples and their physical properties are shown in FIG. 2 which illustrates a table. While the discussion herein is limited to those conducting polymeric dispersions exhibiting superior performance in the experiments, it should be noted that a number of dispersions may be suitable—depending upon the particular application requirements. More specifically, dispersions of polyphenylene, polyphenylene vinylene, polyethylenesulfide and derivatives of all the mentioned conducting polymers should produce satisfactory results.

In addition, other polymeric components such as acrylics, polyurethanes, epoxies, amino resins, phenolics, vinylics, polyesters, etc. may be added to enhance particular characteristics of the coating.

Returning now to the description of the method, after stirring the conducting polymeric dispersion (and any polymeric components), a quantity of inorganic salt(s) or mixtures thereof are added to the conducting polymeric dispersion and subsequently mixed until the added salts are suitably dissolved. Example salts include the inorganic salts of molybdenum, magnesium, zirconium and titanium. More particularly, sodium molybdate, potassium permanganate, potassium hexafluorozirconate and potassium hexaflorotitanate have been used with success. Final concentrations of the added salts in the bath solution(s) may vary over a wide range, e.g., 2 g/L (grams per liter)-20 g/L (grams per liter).

After the inorganic salt(s) or mixtures thereof are added to the conducting polymeric dispersion and subsequently mixed until the added salts are suitably dissolved, a quantity of silane(s), or mixtures thereof, are added to the conducting polymeric/salt(s) dispersion and subsequently mixed until the added silanes are suitably dissolved. The particular silanes used in the examples and their molecular and structural formula are shown in FIG. 7. (3-Glycidoxypropyl) trimethoxysilane (GPMS), 1,2-Bis(trimethoxysilyl)ethane (TMSE), 1,2-Bis(Triethoxysilyl) Ethane (BTSE), Bis[3-(trimethoxysilyl)propyl]amine (BAS) and Vinyltriacetoxysilane (VTAS) have been used with success. The final concentrations of the added salts in the bath solution(s) may vary over a range, e.g., % 0.01 vol. (% v/v)-% 1.0 vol. (% v/v).

Finally, the polymeric dispersion/inorganic salt/silane solution is subsequently pH adjusted using alkaline compounds such as ammonia or phosphate or acidic compounds, including hexafluorozirconic acid and fluorhydric acid.

EXAMPLES

A number of samples of two particular aluminum alloys, namely 2024T3 and 7075T6 alloys were subjected to the chromium-free conversion process and evaluated. Those showing superior characteristics in salt spray fog corrosion tests (SSFCT) were obtained using PPY and PEDOT in combination with hexafluorozirconic. The particular experimental conditions are shown in the tables of FIGS. 3 and 4 for PEDOT/Zr, PPY/Zr, based compositions and the tables of FIGS. 5 and 6 show the obtained results, respectively. For all of the samples shown in these tables of FIGS. 3-6, the drying conditions were substantially room temperature and pressure, for a period of time of at least 24 hours.

More specifically, the table of FIG. 3 shows the experimental conditions for PEDOT/Zr. In this set, the [Zr] (zirconium) concentration was effected by varying the amounts of $K_2ZrF_6$ (potassium hexafluorozirconate) and the pH was adjusted with $H_2ZrF_6$ (fluorozirconic acid) and/or $NH_4OH$ (ammonium hydroxide).

The table of FIG. 4 shows the experimental conditions used for a PPY/Zr set of samples. In this particular set, the [Zr] (zirconium) concentration was effected by varying the amounts of $K_2ZrF_6$ (potassium hexafluorozirconate) and the pH was adjusted with $H_2ZrF_6$ (fluorozirconic acid) and/or $NH_4OH$ (ammonium hydroxide).

Turning now to the table of FIG. 5, there it shows the corrosion resistance for the PEDOT/Zr conversion coating on both 2024-T3 and 7075-T6 aluminum alloys. The results obtained were after 168 hours of salt spray fog corrosion testing (SSFCT) and the hexavalent chromium based commercial ALODINE 1200S exhibited the best corrosion performance, with a corrosion score of 10.0. The corrosion score values go from 0 (zero) for the worst corrosion performance to 10 (ten) for best corrosion performance.

Similarly, the table of FIG. 6 shows the corrosion resistance for the PPY/Zr coating on the 2024-T3 and 7075-T6 alloys as well as the ALODINE 1200S treated alloys.

A number of samples of two particular aluminum alloys, namely 2024T3 and 7075T6 alloys, were subjected to the polymeric dispersion/inorganic salt/silane chromium-free conversion process and evaluated. Those showing superior characteristics in salt spray fog corrosion tests (SSFCT) were obtained using PPY and PEDOT in combination with hexafluorozirconate and GPMS, TMSE and BTSE silanes—added either alone or in combination. Those showing superior characteristics in the scribed wet tape paint adhesion tests of a subsequently applied organic coating were obtained using PPY and PEDOT in combination with hexafluorozirconate and GPMS, TMSE, BTSE, BAS and VTAS silanes—added either alone or in combination. Some of the proposed treatments provided combined superior characteristics in salt spray fog corrosion tests and in the scribed wet tape paint adhesion tests of a subsequently applied organic coating. Additionally, some of those treatments providing combined superior characteristics in salt spray fog corrosion tests and in wet tape paint adhesion tests of a subsequently applied organic coating also provided superior characteristics in surface contact electrical resistance measurements. The particular experimental conditions are shown in the tables of FIGS. 8 and 9 for PEDOT/Zr/silane and PPY/Zr/silane based compositions and the tables of FIGS. 10 and 11 show the obtained results, respectively. For all of the samples shown in these tables of FIGS. 8-11, the drying conditions were substantially room temperature and pressure, for a period of time of at least 24 hours.

More specifically, the table of FIG. 8 shows the experimental conditions for PEDOT/Zr/silane. In this set, the [Zr] (zirconium) concentration was effected by varying the amounts of $K_2ZrF_6$ (potassium hexafluorozircoante) and the pH was adjusted with $H_2ZrF_6$ (fluorozirconic acid) and/or $NH_4OH$ (ammonium hydroxide).

The table of FIG. 9 shows the experimental conditions for a PPY/Zr/silane set of samples. In this particular set, the [Zr] (zirconium) concentration was effected by varying the amounts of K₂ZrF₆ (potassium hexafluorozirconate) and the pH was adjusted with H₂ZrF₆ (fluorozirconic acid) and/or NH₄OH (ammonium hydroxide).

Turning now to the table of FIG. 10, there it shows the corrosion resistance for the PEDOT/Zr/silane conversion coating on both 2024-T3 and 7075-T6 aluminum alloys. The results obtained were after 168 hours of salt spray fog corrosion testing (SSFCT) and the hexavalent chromium based commercial ALODINE 1200S exhibited the best corrosion performance, with a corrosion score of 10.0. The corrosion score values go from 0 (zero) for the worst corrosion performance to 10 (ten) for best corrosion performance. The table in FIG. 10 also shows the adhesion performance of a subsequently applied organic coating on both 2024-T3 and 7075-T6 aluminum alloys. The paint adhesion performance was measured according to a wet tape paint adhesion test. Once dried (after 14 (fourteen) days air curing), the corresponding conversion coated panels were painted with an epoxy primer according to the MIL-PRF-85582 standard. The epoxy primer used was a water-reducible epoxy primer system made of 10PW20-4 base and ECW-104 hardener according to MIL-PRF-85582 Type 1 Class 2, provided by Akzo Nobel Aerospace Coatings, BV. Two parallel, 2 (two) inch long scratches, ¾ to 1 (one) inch apart through the coating and to the substrate were made on the panels. The parallel scratches were joined with two intersecting lines, or an "X" pattern. The primed and scribed panels were immersed in deionized water during 24 hours, prior to carrying out the wet paint adhesion tests. Within 2 (two) minutes after removing test panels from water adhesive tape was applied and pressed against the test surface with firm hand pressure and then removed. The hexavalent chromium based commercial ALODINE 1200S exhibited the best pant adhesion performance, with an adhesion score of 10.0. The adhesion test score values go from 0 (zero) for the worst adhesion performance (total detachment of the primer) to 10 (ten) for best adhesion performance (no detachment of the primer). The table in FIG. 10 also shows the surface contact electrical resistance for the PEDOT/Zr/silane conversion coating on 2024-T3, 7075-T6 and 6061-T6 aluminum alloys. The surface contact electrical resistance of the coatings was measured as described in the MIL-DTL-81706-B standard. The applied load shall be within one percent of the calculated 200 psi (pounds per square inch) applied pressure. The contacting electrodes were copper or silver-plated copper with a finish not rougher than that obtained by the use of 000 metallographic abrasive paper. The electrodes were flat enough so that when the load was applied without a specimen between them, light is not visible through the contacting surface. The area of the upper electrode was one square inch (25 square mm (millimeters)) and the area of the lower electrodes was larger. The maximum electrical resistance values allowed by aeronautical standards for 6061 T6 alloy are of 5000 µΩ/square inch (5 mΩ/square inch) before salt spray exposure test. The hexavalent chromium based commercial ALODINE 1200S exhibited the lowest surface contact electrical resistance for the 2024-T3 and 7075-T6 alloys. The values for the PEDOT/Zr/silane treatments were also well below the 5 mΩ/square inch.

Similarly, the table of FIG. 11 shows the corrosion resistance, the paint adhesion performance and the surface contact electrical resistance measurements for the PPY/Zr/silane coatings on the 2024-T3, 7075-T6 and 6061-T6 alloys as well as the ALODINE 1200S treated alloys.

At this point, it should be noted that in addition to the Zr (zirconium) salts used in these exemplary tests, other salts—either alone or in combination—may produce satisfactory results as well. In particular, salts of vanadium, cerium, hafnium, silicon, aluminum, boron, cobalt, magnesium, and zinc may be employed. Additionally, other bath components such as pH adjusting compounds, solvents, non-aqueous dispersion media, other silanes, dispersing agents, surfactants and coalescing solvents may be used to provide various degrees of coating effectiveness. Further, while the method and resulting coating(s) have been described in the context of immersion bath(s), it is understood that alternative coating, i.e., spray coating may be used as well. Lastly, other metallic substrates, such as steel, aluminum, copper, and/or iron and/or their alloys, will benefit from our method and coating(s).

While the disclosure discusses and describes herein some specific examples, those skilled in the art will recognize that our teachings are not so limited. More specifically, it is understood that the method and coating may be used in virtually any application requiring corrosion protection, and/or adhesion of subsequently applied organic coating(s) and/or low electrical surface contact resistance and in particular, those applications concerned with the problems associated with hexavalent chromium. Accordingly, it is understood that the method and coating may be applicable to any automotive, marine, construction, industrial, or household use in addition to aeronautical applications and therefore should be only limited by the scope of the claims attached hereto.

What is claimed is:

1. A process for treatment of metallic surfaces, the process comprising the steps of:
    pretreating the metallic surfaces;
    coating the metallic surfaces with a conversion coating by contacting the metallic surfaces with a conducting polymer dispersion consisting of:
        a conducting polymer selected from the group consisting of polyaniline (PANI), polyethylenedioxythiophene (PEDOT) and polypyrrole (PPY);
        one or more silanes selected from the group consisting of (3-Glycidoxypropyl)trimethoxysilane (GPMS), 1,2-Bis(trimethoxysilyl)ethane (TMSE), 1, 2-Bis(Triethoxysilyl) Ethane (BTSE), and Vinyltriacetoxysilane (VTAS), or combinations of two or more thereof; and,
        inorganic metallic salts selected from at least one of molybdenum, magnesium, zirconium, titanium, vanadium, cerium, hafnium, silicon, aluminum, boron, cobalt and zinc in concentrations of the inorganic metallic salts between 2.0 g/L (grams per liter) and 20 g/L (grams per liter) and a pH value of between 1 and 6.0; and,
    drying the metallic surfaces.

2. The process according to claim 1, wherein the one or more silanes are water soluble.

3. The process according to claim 1, wherein the one or more silanes are present in an amount of from 0.01 v % (volume percent)-1.0 v % (v/v) of the conducting polymer dispersion.

4. The process according to claim 1, wherein the one or more silanes are of a formula:

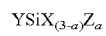

wherein,
    X are independently selected hydrolysable groups,
    Y is non-hydrolysable and includes a functional group,
    Z is independently selected from H or alkyl, and
    a is 0, 1 or 2.

5. The process according to claim 4, wherein a is 0.

6. The process according to claim 4, wherein the hydrolysable groups are selected from the group consisting of methoxy or ethoxy.

7. The process according to claim 4, wherein:
the functional group is selected from the group consisting of vinyl, amino, epoxy or mercapto; and/or
the functional group is linked to Si (the silicon atom) by an alkyl group, an alkyl ether group or an alkyl amine group.

8. The process according to claim 4, wherein Y is —$RSiX_{3-a}Z_a$, and wherein R is an alkyl group, an alkyl ether group or an alkyl amine group.

9. The process according to claim 1 wherein the pretreatment step further comprises the steps of:
degreasing the metallic surfaces;
cleaning the metallic surfaces; and
deoxidizing the metallic surfaces.

10. The process according to claim 1, wherein the inorganic metallic salts comprise a salt of zirconium, the concentration of inorganic metallic salts of zirconium are produced with $K_2ZrF_6$ (potassium hexafluorozirconate) and the pH is adjusted with $H_2ZrF_6$ (fluorozirconic acid) and/or $NH_4OH$ (ammonium hydroxide).

11. The process according to claim 1, wherein the metallic surfaces are ones selected from the group consisting of aluminum, copper, iron, or alloys thereof.

12. The process according to claim 1, wherein the inorganic metallic salts are present in a concentration of between 2.0 g/L (grams per liter) and 8.0 g/L (grams per liter) and/or wherein the contacting the metallic surfaces step is carried out at a pH of between 2 and 5.

13. The process according to claim 1, wherein the metallic surfaces are ones selected from the group consisting of 2024-T3 and 7075-T6.

14. A process for treatment of metallic surfaces, the process comprising the steps of:
pretreating the metallic surfaces;
coating the metallic surfaces with a conversion coating by contacting the metallic surfaces with a conducting polymer dispersion consisting of:
a conducting polymer;
one or more silanes selected from the group consisting of (3-Glycidoxypropyl)trimethoxysilane (GPMS), 1,2-Bis(trimethoxysilyl)ethane (TMSE), 1, 2-Bis (Triethoxysilyl) Ethane (BTSE), and Vinyltriacetoxysilane (VTAS), or combinations of two or more thereof; and,
inorganic metallic salts selected from at least one of molybdenum, magnesium, zirconium, titanium, vanadium, cerium, hafnium, silicon, aluminum, boron, cobalt and zinc in concentrations of the inorganic metallic salts between 2.0 g/L (grams per liter) and 20 g/L (grams per liter) and a pH value of between 1 and 6.0; and,
drying the metallic surfaces.

15. The process according to claim 14, wherein the one or more silanes are water soluble.

16. The process according to claim 14, wherein the one or more silanes are present in an amount of from 0.01 v % (volume percent)-1.0 v % (v/v) of the conducting polymer dispersion.

17. The process according to claim 14, wherein the one or more silanes are of a formula:

$YSiX_{(3-a)}Z_a$ wherein,
X are independently selected hydrolysable groups,
Y is non-hydrolysable and includes a functional group,
Z is independently selected from H or alkyl, and
a is 0, 1 or 2.

18. The process according to claim 17, wherein the hydrolysable groups are selected from the group consisting of methoxy or ethoxy.

* * * * *